US008838500B2

(12) United States Patent
Sugano et al.

(10) Patent No.: US 8,838,500 B2
(45) Date of Patent: Sep. 16, 2014

(54) DIGITAL DATA REPRODUCING DEVICE

(75) Inventors: Masaru Sugano, Saitama (JP); Koichi Takagi, Saitama (JP); Yousuke Toyota, Saitama (JP)

(73) Assignee: KDDI Corporation, Tokyo (JP)

( * ) Notice: Subject to any disclaimer, the term of this patent is extended or adjusted under 35 U.S.C. 154(b) by 1232 days.

(21) Appl. No.: 12/264,294

(22) Filed: Nov. 4, 2008

(65) Prior Publication Data

US 2009/0119781 A1   May 7, 2009

(30) Foreign Application Priority Data

Nov. 5, 2007   (JP) ................................. 2007-287447

(51) Int. Cl.
```
G06Q 99/00        (2006.01)
G06F 21/10        (2013.01)
H04N 7/16         (2011.01)
H04N 21/4402      (2011.01)
H04N 21/4405      (2011.01)
H04N 21/4627      (2011.01)
H04N 21/8355      (2011.01)
```
(52) U.S. Cl.
CPC ............ G06F 21/10 (2013.01); *G06Q 2220/12* (2013.01); H04N 7/163 (2013.01); H04N 21/440254 (2013.01); H04N 21/4405 (2013.01); H04N 21/4627 (2013.01); H04N 21/8355 (2013.01)
USPC ............................................. 705/51; 726/26

(58) Field of Classification Search
USPC .......................................................... 705/51
See application file for complete search history.

(56) References Cited

U.S. PATENT DOCUMENTS

| 7,000,171 | B2 * | 2/2006 | Sako et al. | 714/763 |
| 7,646,882 | B2 * | 1/2010 | Muratani | 382/100 |
| 7,702,589 | B2 * | 4/2010 | Candelore | 705/55 |
| 7,848,521 | B2 * | 12/2010 | Leporini et al. | 380/241 |
| 7,895,638 | B2 * | 2/2011 | Becker et al. | 726/2 |
| 8,265,278 | B2 * | 9/2012 | Moskowitz et al. | 380/252 |
| 8,270,811 | B2 * | 9/2012 | Inokuchi et al. | 386/252 |
| 8,681,980 | B2 * | 3/2014 | Levy | 380/228 |

(Continued)

FOREIGN PATENT DOCUMENTS

| JP | 2001-067794 | 3/2001 |
| JP | 2002-006885 | 1/2002 |

(Continued)

OTHER PUBLICATIONS

DRM Specification Candidate Version 2.0—Jul. 16, 2004, Open Mobile Alliance OMA-DRM-DRM-V2_0-20040716-C, Jul. 16, 2004, 142 pages.*

(Continued)

*Primary Examiner* — James D Nigh
(74) *Attorney, Agent, or Firm* — Westman, Champlin & Koehler, P.A.

(57) ABSTRACT

The present invention provides a digital data reproducing device having a simple configuration and being capable of protecting copyright of digital data such as video or audio. Content provider side embeds copyright management information (cumulative number of reproduction times, permissible number of reproduction times, etc.) into digital data that has been degraded by scrambling, and provides it to a content user. A reproducing device of the content user side causes copyright management information detection unit to detect the copyright management information, decreases the data degradation depending on result of the detection, and reproduces by data reproducing unit.

12 Claims, 3 Drawing Sheets

(56) References Cited

U.S. PATENT DOCUMENTS

| | | | |
|---|---|---|---|
| 2002/0188567 A1* | 12/2002 | Candelore | 705/51 |
| 2003/0110132 A1 | 6/2003 | Sako | 705/51 |
| 2003/0182579 A1* | 9/2003 | Leporini et al. | 713/201 |
| 2003/0216824 A1* | 11/2003 | Chu et al. | 700/94 |
| 2004/0136528 A1 | 7/2004 | Muratani | 380/37 |
| 2005/0236475 A1* | 10/2005 | Becker et al. | 235/382.5 |
| 2006/0123246 A1* | 6/2006 | Vantalon et al. | 713/189 |
| 2007/0209077 A1* | 9/2007 | Kitani | 726/26 |

FOREIGN PATENT DOCUMENTS

| | | |
|---|---|---|
| JP | 2002-6885 | 1/2002 |
| JP | 2002-140077 | 5/2002 |
| JP | 2003-319370 | 11/2003 |
| JP | 2004-030630 | 1/2004 |
| JP | 2006-127656 | 5/2006 |
| JP | 2006-279428 | 10/2006 |
| JP | 2007-19867 | 1/2007 |
| JP | 2007-174375 | 7/2007 |
| WO | WO 01/99106 A1 | 12/2001 |

OTHER PUBLICATIONS

Machine translation of JP.2003-319370.A, obtained via http://www4.ipdl.inpit.go.jp/Tokujitu/tjsogodbenk.ipdl from Japanese Patent Office website on Jun. 26, 2014, 33 pages.*
Japanese Office Action and translation for corresponding Application No. 2007-287447, dated Dec. 14, 2011.

* cited by examiner

DIGITAL DATA REPRODUCING DEVICE

The present application claims priority of Japanese patent application Serial No. 2007-287447, filed Nov. 5, 2007, the content of which is hereby incorporated by reference in its entirety.

BACKGROUND OF THE INVENTION

1. Field of the Invention

The present invention relates to a digital data reproducing device, and more specifically, a digital data reproducing device that is capable of controlling degradation level of digital data according to number of reproduction times, a time limit for reproduction, or copy operation, and of contributing to copyright protection, in reproducing devices for reproducing digital data such as video, audio in particular.

2. Description of the Related Art

Japanese Patent Application Laid-Open (JP-A) No. 2006-279428 (Patent Document 1) discloses a compressed data scrambling delivery device with means for applying a plurality of scrambles to encoded data, and embedding into scrambled compressed data a signal for discriminating the applied scrambled signals as digital watermark data. When reproducing the data, the device determines a method of descrambling based on the embedded signals as the digital watermark, and descrambles the compressed data using the method.

JP-A No. 2004-030630 (Patent Document 2) discloses a method of a content provider specifying a quality degradation policy or a quality degradation specification model for every digital data, wherein if the digital data is copied or moved, the copied data will be degraded according to the policy or the model.

JP-A No. 2001-067794 (Patent Document 3) discloses means for holding in a header of content data a reproducible period, number of reproducible times, and number of reproduction times, and for determining whether or not to reproduce depending on the reproducible period or the number of reproducible times.

JP-A No. 2002-006885 (Patent Document 4) rewrites content of digital data based on condition information showing a time limit for reproduction when the time limit for reproduction reaches, and notifies that the time limit for reproduction is approaching, by doing this rewrite whenever reproduction is performed.

JP-A No. 2006-127656 (Patent Document 5) discloses means for mixing noise into content data limited in number of reproduction times, as the number of reproduction times approaches the limited number of reproduction times, and for causing the data to degrade in stages.

In an approach of the Patent Document 1, as it is necessary to have a key corresponding to each scramble when a plurality of scrambles are applied to single digital data, amount of data to be embedded as digital watermark increases, thereby possibly degrading quality of digital data.

In an approach of the Patent Document 2, as it is necessary to specify a quality degradation policy for every digital data, operation cost involved in delivery of content of a content provider will be enormous. Furthermore, the approach does not disclose a method of degradation associated with number of reproduction times of digital data.

By contrast, although the Patent Documents 3, 4, and 5 disclose a mechanism of degrading data as number of reproduction times increases, based on the number of reproduction times and information related thereto, data itself flows normally in any case. Thus, if any normal reproducing device other than those disclosed in these Patent Documents is used, there is a problem that desired operation cannot be achieved because information of number of reproduction times cannot be interpreted.

In addition, in all of prior arts, it is not assumed to gradually refine degraded digital data according to the information on the number of reproduction times.

SUMMARY OF THE INVENTION

It is an object of the present invention to provide a digital data reproducing device having a simple configuration and being capable of protecting copyright of digital data such as video or audio.

In order to achieve the object, the present invention has a characteristic that a reproducing device of digital data such as video or audio, the digital data reproducing device comprises data reading unit for reading digital data that has been degraded in advance, copyright management information detection unit for detecting copyright management information embedded in the degraded data, data degradation decreasing unit for decreasing degradation of the degraded data based on the copyright management information, and data reproducing unit for reproducing the degraded data where the degradation has been decreased.

The present invention has another characteristic that the copyright management information is embedded in the degraded data by digital watermark, the copyright management information detection unit detects the copyright management information embedded by the digital watermark, and the copyright management information updating unit updates the copyright management information and embeds the updated copyright management information into the degraded data again as the digital watermark.

In addition, the present invention has another characteristic that it degrades in advance digital data to be distributed, thereby controlling level of decreasing the degradation by number of reproduction times, a time limit for reproduction, or whether or not there is a copy.

According to the present invention, as degradation level of such digital data as video or audio, being distributed in degraded condition can be controlled according to number of reproduction times, elapsed time, or copy operation, copyright of the digital data can be protected.

In addition, as digital data to be delivered is data in degraded condition, only degraded data is reproduced if it is reproduced by a normal reproducing device that has no reproducing function of the present invention. Therefore, copyright of the digital data can be protected.

DETAILED DESCRIPTION OF THE PREFERRED EMBODIMENTS

The present invention will be described hereinafter with reference to the accompanying drawings. Although the description covers video data encoded in an MPEG format, the present invention can be applied to any media data such as audio data as well as video data. In addition, media data may be in any compression format or may be uncompressed.

In addition, it is assumed that unit for degrading data shall apply reversible degradation to target video data in advance. Although degradation level can be set optionally, a structure (syntax) as video data should be held. Thus, a normal video reproducing device can reproduce degraded video data without causing an error. A scrambling scheme can be used as unit for degrading data, and a technology disclosed in JP-A No. 2007-174375 can be used as multilayered scrambling to video data encoded in an MPEG format, for example. By dividing the process of adding any scramble value to DC components in a DCT coefficient block in multiple times, the intensity of scrambling can be changed in stages according to the number of the processed blocks.

Figure 7:
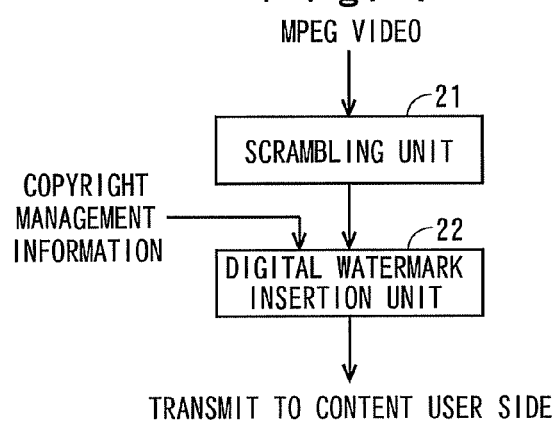
FIG. 7 is a block diagram showing outline of operations of content provider side.

With reference to FIG. 7, the function of content provider side that is a prerequisite for the present invention will be briefly described. The content provider side applies scrambling (reversible degradation) to video data encoded in an MPEG format in a scrambling unit 21, embeds in the video data copyright management information to be described later in a digital watermark insertion unit 22, and transmits or provides it to content user side. Embedding copyright management information in video data by a digital watermark is one example, and any other method such as inserting into a header of video data, for example, may be used.

Figure 1:
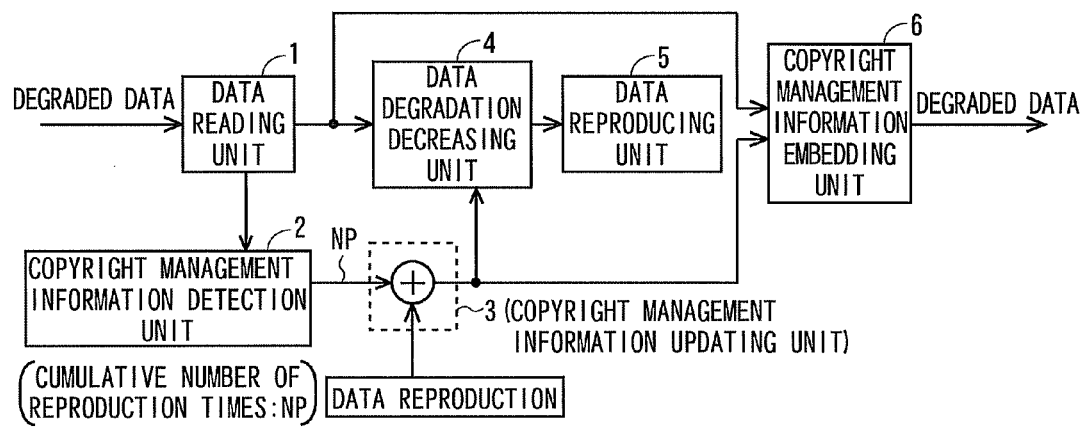
FIG. 1 is a block diagram showing a schematic configuration of a first embodiment of the present invention.

Next, a digital data reproducing device according to a first embodiment of the present invention will be described with reference to a block diagram of FIG. 1. In the following, a description will be given on a video data reproducing device, by way of example.

The video data that was provided via a communication medium or a storage medium by the content provider and reversibly degraded by the scrambling is read into data reading unit 1. Then, when operation of reproducing the video data is specified, copyright management information detection unit 2 detects copyright management information embedded in the video data. As copyright management information, cumulative number of reproduction times NP is used, and the copyright management information embedded in the video data has a value of "0" in a stage that content is purchased, for example.

Next, copyright management information updating unit 3 updates the copyright management information. For example, in the case of a first (first-time) reproduction, output of the copyright management information updating unit 3 is "1", and the updated copyright management information is sent to data degradation decreasing unit 4 and copyright management information embedding unit 6. The copyright management information embedding unit 6 embeds the updated copyright management information into the degraded data again. The degraded data in which the copyright management information has been updated can be written into a storage medium, as necessary. In addition, "0" prior to updating may be used as the copyright management information to be sent to the data degradation decreasing unit 4.

The data degradation decreasing unit 4 decreases degradation of video data based on the output of the copyright management information updating unit 3, and thus a frame of the video data is reproduced. The video data where degradation has been decreased is sent to a data reproducing unit 5 where it is reproduced.

Figure 2:
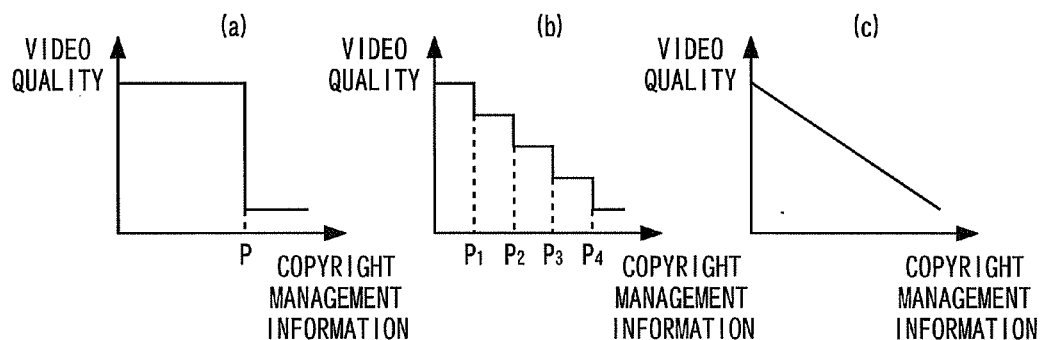
FIG. 2 is a drawing showing three aspects of decrease of degradation.

Now, level of decrease can be set variously, as shown in FIG. 2. In other words, a method that completely removes degradation up to P times (P is an integer of P>1) of reproductions as shown in FIG. 2(a), a method that completely removes degradation up to P1 time of reproduction and decreases removal of degradation in a discrete (nonlinear) manner as reproduction proceeds P2 times, P3 times, P4 times, as shown in FIG. 2(b), and a method that decreases removal of degradation in a continuous (linear) manner as the number of reproduction times increases, as shown in FIG. 2(c) can be set.

Use of multilayered scrambling enables control of degradation according to copyright management information, by descrambling in stages with a value of the copyright management information as a parameter. First, an example of decreasing the intensity of scrambling in stages will be described. For example, if scrambling for shifting DCT coefficient blocks in a macro block was applied, the process of returning all shifted blocks to their original positions when a value of the copyright management information is "1" and of decreasing the number of blocks to be returned to their original positions, as the value of the copyright management information increases by predetermined number of times may be performed. Alternatively, types of scrambling applied may be held as separate key information. In this case, it can be determined in the video reproducing device based on the key information and the copyright management information how much target scrambling is to be decreased. The key information may be held by a method of embedding it as a file independent of video data, a header of video data, or a digital watermark. If the key exists as an independent file, it can be obtained through a different path as well as the same path.

As a second example of descrambling in stages, decreasing removal of areas to which scrambling is applied may be cited. Now, a frame is divided in advance into some regions, R regions, for example, to each of which scrambling is applied. The process of descrambling all of R regions when a value of the copyright management information is "1", and reducing the number of regions where descrambling is applied as the value of the copyright management information increases may be performed. With this, although the entire frame can be initially viewed without any degradation, degraded area in the frame will expand as the cumulative number of reproduction times NP increases.

As a third example of descrambling in stages, decreasing length of removal of temporal segments to which scrambling is applied may be cited. Now, video data is divided in advance into some temporal segments, S segments, for example, to each of which scrambling is applied. Then, the process of descrambling all of S segments when a value of the copyright management information is "1", and reducing the number of segments where descrambling is applied as the value of the copyright management information increases may be performed. With this, although all segments of the video data can be initially viewed without any degradation, degraded temporal segments will increase as the cumulative number of reproduction times NP increases.

The processes of descrambling by states as described above may be used in any combination.

In addition, in the above examples, the data degradation decreasing unit completely descrambles before the copyright management information is updated, and descrambles according to update of the copyright management information. Contrary to this, it may be possible not to descramble before the copyright management information is updated and to increase scrambling to be removed as the copyright management information is updated.

Figure 3:
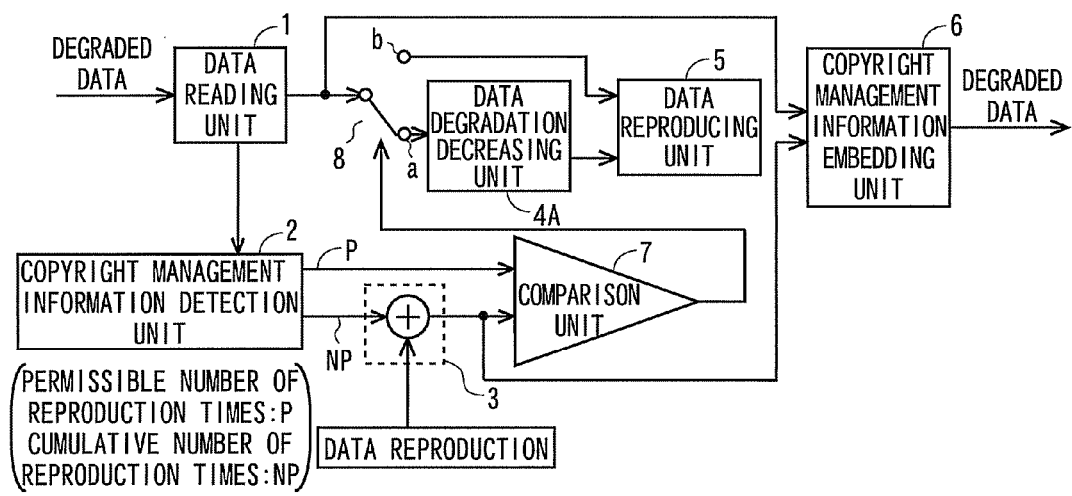
FIG. 3 is a block diagram showing a schematic configuration of a second embodiment of the present invention.

In the following, a second embodiment of the present invention will be described with reference to FIG. 3. This embodiment is an example of when non-multilayered scrambling is used (FIG. 2(a)) wherein control is performed such that no scrambling is removed when a value of the copyright management information no longer satisfies a certain condition. Reference numerals in FIG. 3 that are same as those in FIG. 1 show identical or equivalent components.

In this embodiment, as permissible number of reproduction times and cumulative number of reproduction times are embedded as copyright management information in degraded video data to be provided by a content provider, the copyright management information detection unit 2 detects the permissible number of reproduction times P and the cumulative number of reproduction times NP. The cumulative number of reproduction times NP is updated by the copyright management information updating unit 3, and compared with the permissible number of reproduction times P by comparison unit 7. Alternatively, the cumulative number of reproduction times NP before being updated may be compared with the permissible number of reproduction times P.

The comparison result is sent to switching unit 8, and when P≥NP, the switching unit 8 connects degraded data from the data reading unit 1 to a terminal (a), i.e., the data degradation decreasing unit 4A, and when P<NP, it connects the degraded data to a terminal b, i.e., the data reproducing unit 5. Consequently, when P≥NP, degradation of the degraded data is removed by the data degradation decreasing unit 4A, and data without degradation is sent to the data reproducing unit 5 and is reproduced. In contrast, when P<NP, the degraded data is directly sent to the data reproducing unit 5. Thus, when the cumulative number of reproduction times exceeds the permissible number of reproduction times, only the data with degradation is reproduced.

The copyright management information updated by the copyright management information updating unit 3 is sent to the copyright management information embedding unit 6. The copyright management information embedding unit 6 embeds the cumulative number of reproduction times (NP+1) in cumulative management information into the degraded data from the data reading unit 1.

As described above, according to this embodiment, when an permissible number of reproduction times is set as P times and said condition can no longer be met (i.e., when the cumulative number of reproduction times NP becomes P+1 time), degraded data is directly reproduced without descrambling. Then, although the permissible number of reproduction times P can be directly held by the reproducing device side (for example, P=20, to all contents), it can be set for every content by embedding it in the video data as a part of the copyright management information. If the permissible number of reproduction times P is embedded in the video data, the copyright management information updating unit 3 updates the cumulative number of reproduction times NP only, and does not update the permissible number of reproduction times P.

With the above, a reproducing device by which video data degrades when the video data is reproduced can be configured. However, in order to implement multilayered degradation in the reproducing device, not only the copyright management information is updated but also the updated video data needs to be overwritten.

Figure 4:
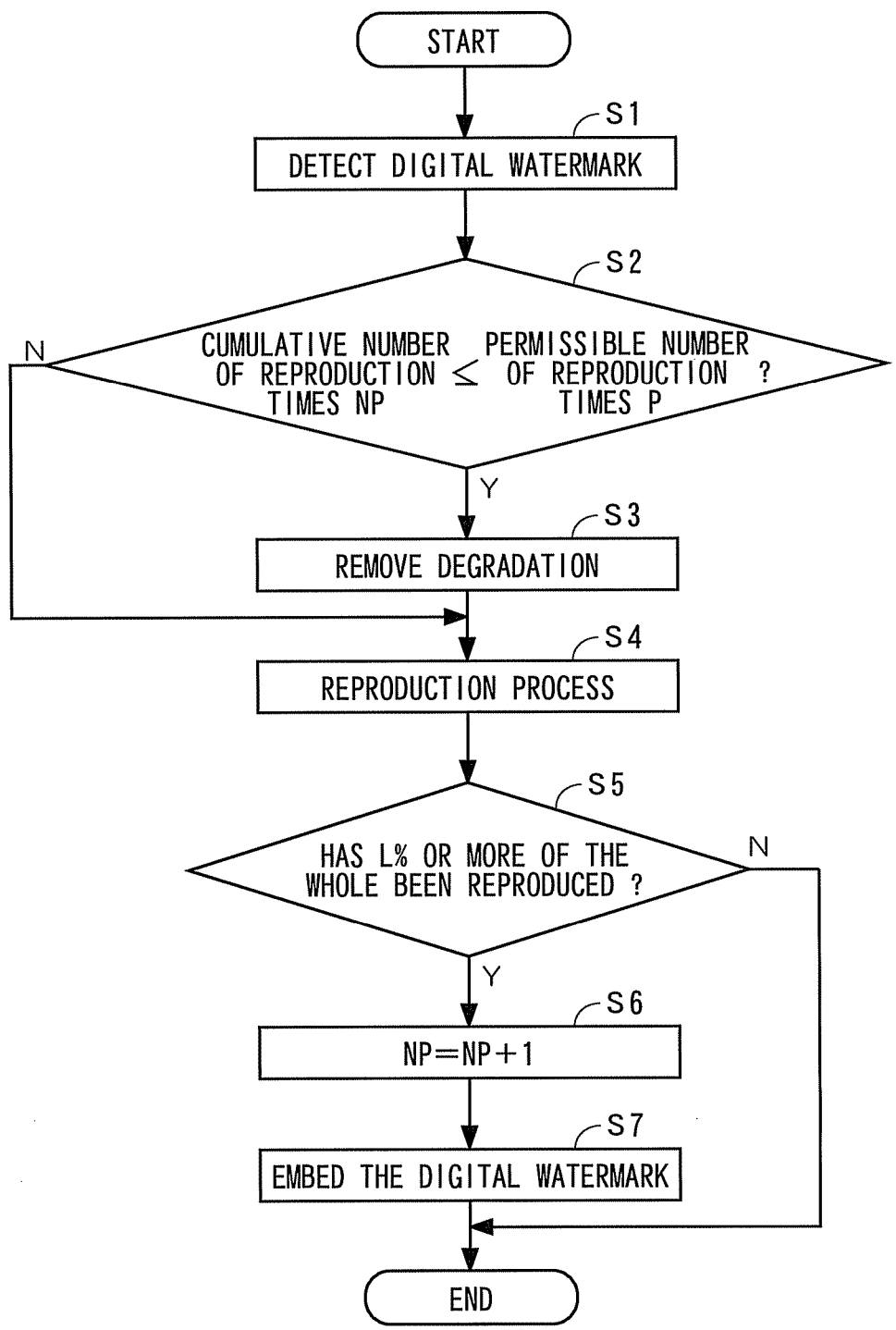
FIG. 4 is a flowchart showing how to count number of reproduction times.

Now, updating of copyright management information when reproduction ends or is suspended will be described with reference to a flow chart of FIG. 4. In step S1, digital watermark is detected, and in Step S2, cumulative number of reproduction times NP is compared with permissible number of reproduction times P. When NP<P, the process proceeds to step S3 where the process of removing degradation is performed, and to step S4 where the reproduction process is performed. In contrast, when NP>P, without removal of degradation, the process goes to step S4 where the reproduction process is performed. The above processes are as described above.

When reproduction is suspended, as shown in step S5, e.g., if only less than L % of length of video content (L=10) is reproduced (determination of step S5 is NO), it is not considered as one reproduction and thus copyright management information is not updated. In contrast, if L % or more of length of video content is reproduced (determination of step S5 is YES), it is considered that one reproduction has been done, and the process proceeds to step S6 where NP is incremented by 1. Then, the process proceeds to S7 where the updated copyright management information is embedded in the video data again and written into the storage medium.

It is desirable that copyright management information to be embedded into video data cannot be discovered or extracted only by interpreting syntax of the data. Thus, the digital watermark technology can be used as means for detecting and embedding copyright management information, and, for example, a technology disclosed as a method of embedding digital watermark in video data encoded in MPEG in JP-A No. 2006-180034 or a method of updating (rewriting) digital watermark disclosed in JP-A No. 2007-116513 can be employed. Alternatively, robustness to attack can be enhanced by encoding copyright management information before being embedded as digital watermark.

According to the operations of the first and second embodiments, a video data reproducing device can be implemented that gradually degrades video data according to number of reproduction times or that completely degrades it when a certain number of reproduction times is exceeded. In addition, in the present invention, as video data is distributed in degraded condition, reproduction operation by any normal reproducing device other than the reproducing device according to the present invention reproduces the data in the degraded condition. With this, even when the video data is obtained illegally, its copyright can be protected.

In addition, as the copyright management information is embedded in video data, a value of the copyright management information can be taken over if it is copied by a normal copy manipulation. In other words, in the example described above, if it is assumed that a value of copyright management information of video data that has been reproduced 10 times is "10", video data newly created by copy operation will also have a value of "10" as copyright management information, and will be updated to "11" when it is later reproduced once by the video reproducing device according to the present invention. Hence, even if the video data is obtained illegally and reproduced by the reproducing device according to the present invention, a period where an illegal action is valid can be limited.

Figure 5:
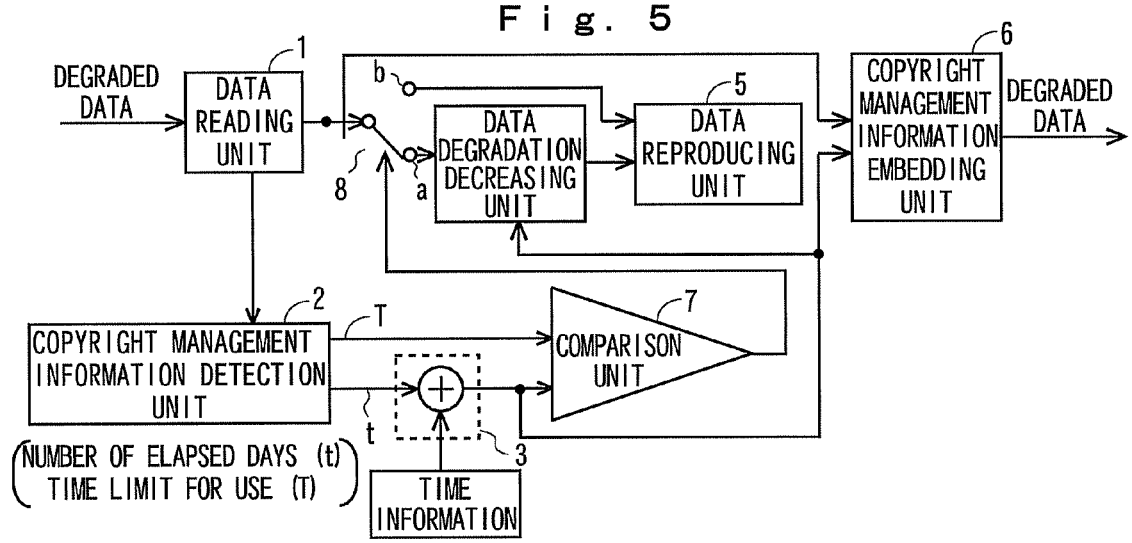
FIG. 5 is a block diagram showing a schematic configuration of a third embodiment of the present invention.

In the following, a third embodiment of the present invention will be described with reference to FIG. 5. This embodiment uses number of days elapsed since video content was purchased as copyright management information. Reference numerals in FIG. 5 that are same as those in FIG. 1 show identical or equivalent components.

When receiving a request for purchase of video content from a user, the content provider embeds a value of "0" as the copyright management information and a current date into degraded video data and delivers it to the consumer.

Then, a video data reproducing device owned by the consumer reads the video data into the data reading unit 1, and the copyright management information detection unit 2 detects number of elapsed days (t) and a time limit for use (T) that are embedded in the degraded data. The copyright management information updating unit 3 updates the number of elapsed days (t) with time information during reproduction. For example, if video content is purchased on January 1, the number of elapsed days (t) will be a value of a combination of "0" and "0101". If a first reproduction is performed on January 3, the value of the number of elapsed days (t) will be updated to "2" and "0103". Then, if a second reproduction is further performed on January 10, the value of the number of elapsed days (t) will be updated to "9" and "0110". After this, a value of the number of elapsed days (t) will be incremented according to date of reproduction. Of the number of elapsed days (t), either of "0", "2", representing the number of days and the "0101", "0103", representing date may be omitted.

The number of elapsed days (t) is sent to the comparison unit 7. The comparison unit 7 makes a comparison of whether the number of elapsed days (t) exceeds the time limit for use (T). If the limit is not passed (t=<T), it connects the switching unit 8 to the terminal (a) side, and if the number of elapsed days (t) is exceeded (t>T), it connects the switching unit 8 to the terminal (b) side.

If the number of elapsed days (t) does not exceed the time limit for use (T), the data degradation decreasing unit 4 decreases degradation with the number of elapsed days (t) as a parameter, and provides the video data after degradation is decreased, to the data reproducing unit 5. In contrast, if the number of elapsed days (t) exceeds the time limit for use (T), the video data is sent to the data reproducing unit 5 without the degraded data being removed.

The copyright management information embedding unit 6 embeds into the degraded data the number of elapsed days (t) that has been updated by the copyright management information updating unit 3.

Unlike the first and second embodiments, this embodiment is characterized in that there is no limit on the number of reproduction times in one day. In addition, as a variant of this embodiment, it is possible not to count number of days after purchase of video content till its first reproduction, as the number of elapsed days. For example, when video content is purchased, a value of "−99" that is not considered as the number of elapsed days, and a date "0101" are embedded as copyright management information. When a first reproduction is performed, the value of copyright management information is updated to "0" and "0103". When a second reproduction is performed, the value of copyright management information is updated to "7" and "0110". As, by doing so, the number of days after purchase of video content till the first reproduction is not counted as the number of elapsed days, this is an advantageous form for users. For example, if a video purchaser does not perform a first reproduction immediately after he/she purchased the video and performs a first reproduction 2 weeks after the purchase, for example, these 2 weeks will not be considered as the number of elapsed days. Although only the number of days is now considered as the copyright management information, number of hours and date of reproduction may be made copyright management information, by examining date and time during reproduction. Similar to the operations in the first and second embodiments, it is possible to implement video data that is completely degraded after a certain elapsed time is exceeded or that is gradually degraded according to the elapsed time.

In addition, in the example described above, although the copyright management information is expressed as a numeric value, it can be described as metadata if much amount of information that can be embedded as digital watermark can be ensured. With this, not only the cumulative number of reproduction times NP and the permissible number of reproduction times P but also any information other than the time limit for reproduction can be embedded. To describe metadata, an XML format, for example, can be used.

Figure 6:
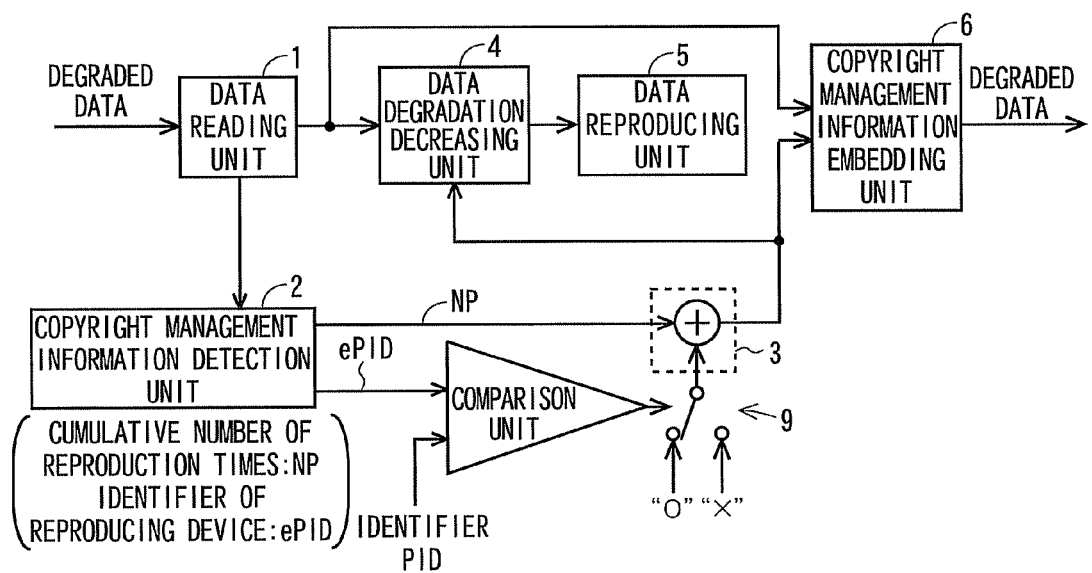
FIG. 6 is a block diagram showing a schematic configuration of a fourth embodiment of the present invention.

Next, a fourth embodiment of the present invention will be described with reference to FIG. 6. Reference numerals in FIG. 6 that are same as those in FIG. 1 show identical or equivalent components.

In this embodiment, an identifier of an authorized reproducing device is embedded as copyright management information, in addition to the cumulative number of reproduction times NP. In other words, a field for an identifier of the reproducing device has been prepared for the copyright management information, and when video content is purchased, the delivery side embeds the identifier ePID of the reproducing device of a content purchaser. As the identifier ePID, an IP address or a MAC address of the reproducing device can be used.

In the reproducing device, the copyright management information detection unit 2 detects the copyright management information embedded in video data. Then, the comparison unit 7 compares the identifier ePID of the reproducing device contained therein with the identifier PID of the aforementioned reproducing device, and the data degradation decreasing unit 4 decreases the degradation and performs reproduction only when they match. In the shown example, when the identifiers match, selection unit 9 selects "0", and the copyright management information updating unit 3 adds "0" to the cumulative number of reproduction times. As a result, as the cumulative number of reproduction times does not vary, the data degradation decreasing unit 4 decreases the degradation.

In contrast, if the identifiers do not match, the selection unit 9 selects X (X is an integer greater than 1). Thus, output of the copyright management information updating unit 3 is (NP+X), and the data degradation decreasing unit 4 does not decrease the degradation, or it reduces the level of decrease. After reproduction, the copyright management information embedding unit 6 updates a variable part of the copyright management information such as the cumulative number of reproduction times NP, without updating the identifier ePID of the reproducing device.

As described above, according to this embodiment, even if a malicious user copies video content, and attempts to reproduce the video data with a reproducing device of another user, the identifier PID of the user's reproducing device and the identifier ePID of the reproducing device embedded in the video data do not match, as the identifier ePID of the reproducing device embedded in the video data is taken over. In addition, in this case, it is possible either not to decrease degradation or reduce the level of decrease of degradation, by adding any numeric value X to the embedded cumulative number of reproduction times NP or multiplying the embedded cumulative number of reproduction times by any numeric value X. Thus, in the former case, copying the video data completely degrades the video data, while in the latter case, the video data degrades in stages as the video data is copied, which can thereby avoid infringement of copyright.

So far the examples in which video data degrades in stages from its original condition have been described. Contrary to this, an embodiment for refining video data in stages from the degraded condition would be possible. In order to refine video data, similar to the above, the data degradation unit applies in advance reversible degradation to video data. Then, while a value of the copyright management information is small or low, the level of decrease is kept low, and the level of decrease of degradation may be enhanced as a value of the copyright manager information increases.

What is claimed is:

1. A method of reproducing digital data using a digital data reproducing device, the method comprising:
    reading degraded data, comprising digital data that has been degraded in advance;
    detecting copyright management information embedded in the degraded data, wherein detecting copyright management information includes detecting a permissible number of reproduction times and a cumulative number of reproduction times, wherein the cumulative number of reproduction times represents a number of times that the degraded data has been reproduced;
    decreasing degradation of the degraded data using a data degradation alleviating unit based on the copyright management information;
    reproducing the degraded data by using a digital data reproducing unit, wherein the degradation has been decreased;
    comparing the cumulative number of reproduction times with the permissible number of reproduction times using a comparison unit;
    updating the copyright management information, wherein updating the copyright management information comprises updating the cumulative number of reproduction times;
    embedding the updated copyright management information into the degraded data; and
    writing into a storage medium the degraded data where the copyright management information has been updated.

2. The method of claim 1, wherein the copyright management information is embedded in the degraded data by digital watermark, the method further comprising:
    detecting the copyright management information embedded by the digital watermark;
    updating the copyright management information; and
    embedding the updated copyright management information into the degraded data again as the digital watermark.

3. The method of claim 2, wherein:
    the copyright management information is indicative of a cumulative number of reproduction times, representing a number of times that the degraded data has been reproduced; and
    updating the copyright management information comprises increasing the cumulative number of reproduction times every time that the degraded data is reproduced.

4. The method of claim 3, wherein:
    permissible number of reproduction times is further embedded as the copyright management information, the cumulative number of reproduction times and the permissible number of reproduction times of the degraded data are compared, and the degradation is decreased, when the cumulative number of reproduction times is below the permissible number of reproduction times.

5. The method of claim 2, wherein:
    the copyright management information is time elapsed since a first reproduction of the degraded data or time elapsed since a purchase of content of the digital data; and
    updating the copyright management information comprises increasing the time elapsed since a first reproduction or the time elapsed since the purchase, as the degraded data is reproduced.

6. The method of claim 5, wherein:
    a time limit for use of the degraded data is further embedded as the copyright management information, the elapsed time and the time limit for use of the degraded data are compared, and the degradation is decreased when the elapsed time is below the time limit for use.

7. The method of claim 3, wherein:
    the copyright management information further includes an identifier of a digital data reproducing device of a user who obtains digital data;
    detecting the copyright information comprises comparing the identifier included in the copyright management information with the identifier of a current reproducing device; and
    the degradation of the degraded data is decreased only when the identifier included in the copyright management information and the identifier of a current reproducing device match.

8. The method of claim 7, wherein:
    the level of decreasing the degradation is reduced as a result of adding any number to the cumulative number of reproduction times or multiplying the cumulative number of reproduction times by any number when the identifier included in the copyright management information and the identifier of a current reproducing device do not match.

9. The method of claim 1, wherein the copyright management information is indicative of a cumulative number of reproduction times, representing a number of times that the degraded data has been reproduced, and wherein the cumulative number of reproduction times is increased as the degraded data is reproduced.

10. The method of claim 1, wherein the copyright management information is time elapsed since a first reproduction of the degraded data or time elapsed since a purchase of content of the digital data, and the time elapsed since a first reproduction or the time elapsed since the purchase is increased, as the degraded data is reproduced.

11. The method of claim 10, wherein a time limit for use of the degraded data is further embedded as the copyright management information, the elapsed time and the time limit for use of the degraded data are compared, and the degradation is decreased when the elapsed time is below the time limit for use.

12. The method of claim 1, wherein updating the copyright management information happens when greater than L percent of the digital data is reproduced, wherein L is indicative of the length of digital data content that has been reproduced.

* * * * *